(12) United States Patent
Sleeper et al.

(10) Patent No.: US 6,367,341 B1
(45) Date of Patent: Apr. 9, 2002

(54) SLIDABLE FIXTURE POSITIONER

(75) Inventors: Howard Lester Sleeper, Boulder Creek; Robert Lynn Gerber, Ridgecrest; Larry Dean Sawyer, Ridgecrest; Theresa M. Atienzamoore, Ridgecrest, all of CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/548,956

(22) Filed: Apr. 17, 2000

(51) Int. Cl.[7] .................. G01M 19/00; G01N 21/01
(52) U.S. Cl. .................. 73/866.5; 73/167; 33/832
(58) Field of Search ................... 73/866.5, 167, 73/865.8; 356/237, 929; 33/506, 832, 833, 703, 706

(56) References Cited

U.S. PATENT DOCUMENTS

| | | | | |
|---|---|---|---|---|
| 4,361,315 A | * | 11/1982 | Kasihara et al. | 73/866.5 X |
| 5,323,660 A | * | 6/1994 | Wirtzer et al. | 73/865.8 |
| 5,331,578 A | * | 7/1994 | Stieler | 73/866.5 |
| 5,460,058 A | * | 10/1995 | Shadoian | 73/865.8 |
| 5,635,780 A | * | 6/1997 | Kolbert | 73/866.5 X |
| 6,237,481 B1 | * | 5/2001 | Franke | 73/865.8 |

* cited by examiner

Primary Examiner—Thomas P. Noland
(74) Attorney, Agent, or Firm—Anthony J. Serventi (57) ABSTRACT

An apparatus for positioning an object in a remote location with a high degree of precision, insuring stability and repeatability for discrete sampling to be taken at intervals between each sampling on the order of years. A preferred embodiment of the present invention positions an optical probe in a propellant bore hole. The present invention measures and records the exact position of an optical probe within the bore hole, so that exact position may be repeated for future measurements to be taken over the lifetime of the system.

20 Claims, 6 Drawing Sheets

SLIDABLE FIXTURE POSITIONER

DEVELOPMENT

The invention described herein may be manufactured and used by or for the government of the United States of America for governmental purposes without the payment of any royalties thereon or therefor.

MICROFICHE APPENDIX

Not Applicable.

BACKGROUND OF THE INVENTION

1. Field of the Invention

The present invention relates generally to a machine for positioning an analytical device. More specifically, the present invention may be used to make propellant surface optical measurements. The measurements are used to determine the aging characteristics of rocket motor propellant.

2. Background

After missiles have been in the field or storage for long periods of time, it may be necessary to determine the dynamic properties of the propellant. There is currently a need for support devices capable of sensing the dynamic properties of rocket motor propellant over long periods of time without disturbing the integrity of the propellant itself. Any change in the dynamic properties of the rocket motor propellant may affect the performance of the rocket motor. As a result, rocket motor propellant is periodically inspected to ensure that the propellant is able to effectively perform its required function.

One common problem of storing various propellants is the migration of nitroglycerin around the liner of a rocket motor casing. The periodic measuring for nitroglycerine and stabilizers at various points in close proximity to the liner is used to determine the rate and concentration of the transfer. This information is used to determine the long term effects of storage in different conditions, such as temperature and relative humidity.

Optical probes are highly useful in determining the characteristics of propellant and the relative concentration of nitroglycerine and other compounds. An optical probe uses light to determine relative concentrations of propellant stabilizer. A precisely positioned light beam is emitted from a hepta plex fiber optic probe onto the propellant surface to be examined. The incident light is reradiated from the propellant surface, captured by a single optical fiber and conveyed to a device, which compares transmitted and received light over a given spectral range. The relative level of stabilizer present is determined from the spectral deltas at the stabilizer characteristic absorption wavelength.

SUMMARY OF THE INVENTION

Broadly, the present invention is an apparatus for positioning an object in a remote location with a high degree of precision and stability. More specifically, the present invention is an apparatus for positioning an optical probe in a propellant bore hole. Also, the present invention is equipped to measure the exact position of an optical probe, so that exact position may be repeated for future measurements to accurately determine the aging characteristics of the propellant. A preferred embodiment of the present invention is positioned using an outer bar and an inner bar connected by parallel rails, an upper bar, and a pressure foot. A base is slidably attached to the rails and a probe positioning rod is attached to the base. A vernier assembly is used to precisely position the base. An analytical device holder is rotatably mounted on a support on the base to analyze the characteristics of a test subject at various points without adjusting the base or vernier assembly.

One object of the present invention is to provide a mechanism for positioning an object with a high degree of specificity and repeating the position for future use.

Another object of the present invention is to provide an apparatus that may position an analytical device in a wide variety of areas with a high degree of precision.

Another object of the present invention is to provide an apparatus that may be positioned in various locations within a propellant bore hole for the purpose of measuring various characteristics of the propellant.

Another object of the present invention is to provide an apparatus that creates stability, while minimizing the potential damage to an object being measured.

Yet another object of the present invention is to provide a mechanism for positioning an optical probe.

A very specific object of the invention is to precisely measure the position of an optical probe in a propellant bore hole, so that the position may be duplicated for future measurements.

DETAILED DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
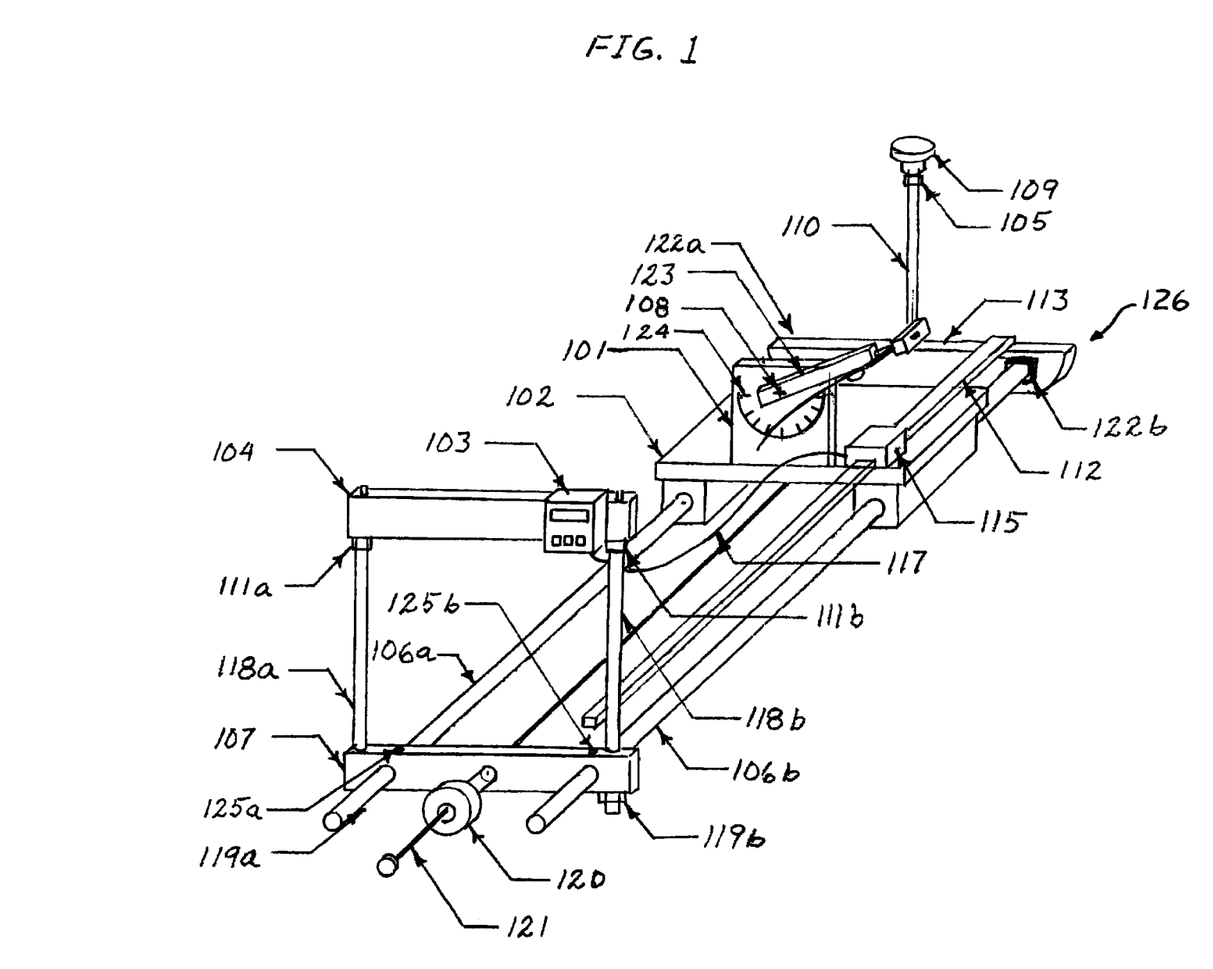
FIG. 1 is a pictorial representation of a preferred embodiment of the slidable fixture positioner of a preferred embodiment of the present invention.

Referring more specifically to the drawings, for illustrative purposes, a preferred embodiment of the present invention is embodied in the apparatus as shown in FIG. 1 through FIG. 6. Referring to FIG. 1, the present invention consists of a device holder assembly 123 rotatably attached to a vertical support 101 by a wing nut and bolt 108. The vertical support 101 is secured to a base 102, which is slidably attached to a pair of parallel rails 106a and 106b. In a preferred embodiment, the base 102 is slidably attached to the rails 106a and 106b through linear bearings and a scale 124 is located on the vertical support 101, so that the position of the device holder assembly 123 relative to the base 102 may be repeated. The rails 106a and 106b are affixed to a lower inner bar 113 and slidably attached to the lower outer bar 107. The lower outer bar 107 may be fixed in a position on the rails by locking screws 125a and 125b. One end of a position measurement rod 112 is longitudinally attached to the lower inner bar 113 and slidably supported by the measurement sensing unit 115, which is fixed to the base 102. The measurement sensing unit 115 detects minor changes in the position of the base 102 along the rails 106a and 106b. A data cable 117 connects the measurement sensing unit 115 to the position readout box 103, which is secured to the upper bar 104. The upper bar 104 is slidably attached to two parallel threaded rods 118a and 118b and supported by tension nuts 111a and 111b, which are threadably attached to the rods 118a and 118b. The parallel threaded rods 118a and 118b are threadably attached to the lower outer bar 107 and are held in place by jam nuts 119a and 119b. The positioning rod 121 is longitudinally attached to the base 102 and slidably supported in the probe positioning vernier 120. A pressure foot 109 is slidably attached to a foot rod 110 and supported by a tensioning nut 105, which is threadably attached to the foot rod 110. The foot rod 110 is threadably attached to the lower inner bar 113.

Figure 2:
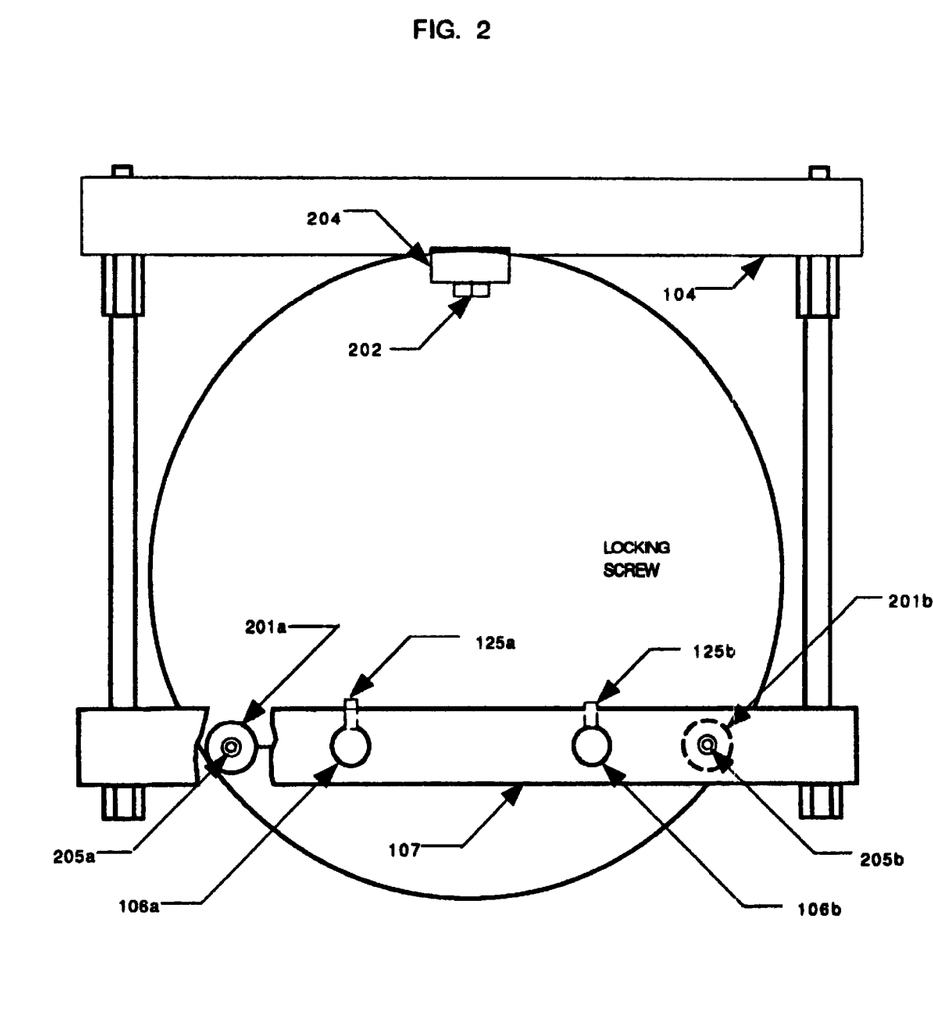
FIG. 2 is a pictorial representation of the outer support assembly of the slidable fixture positioner of a preferred embodiment of the present invention.
Figure 5:
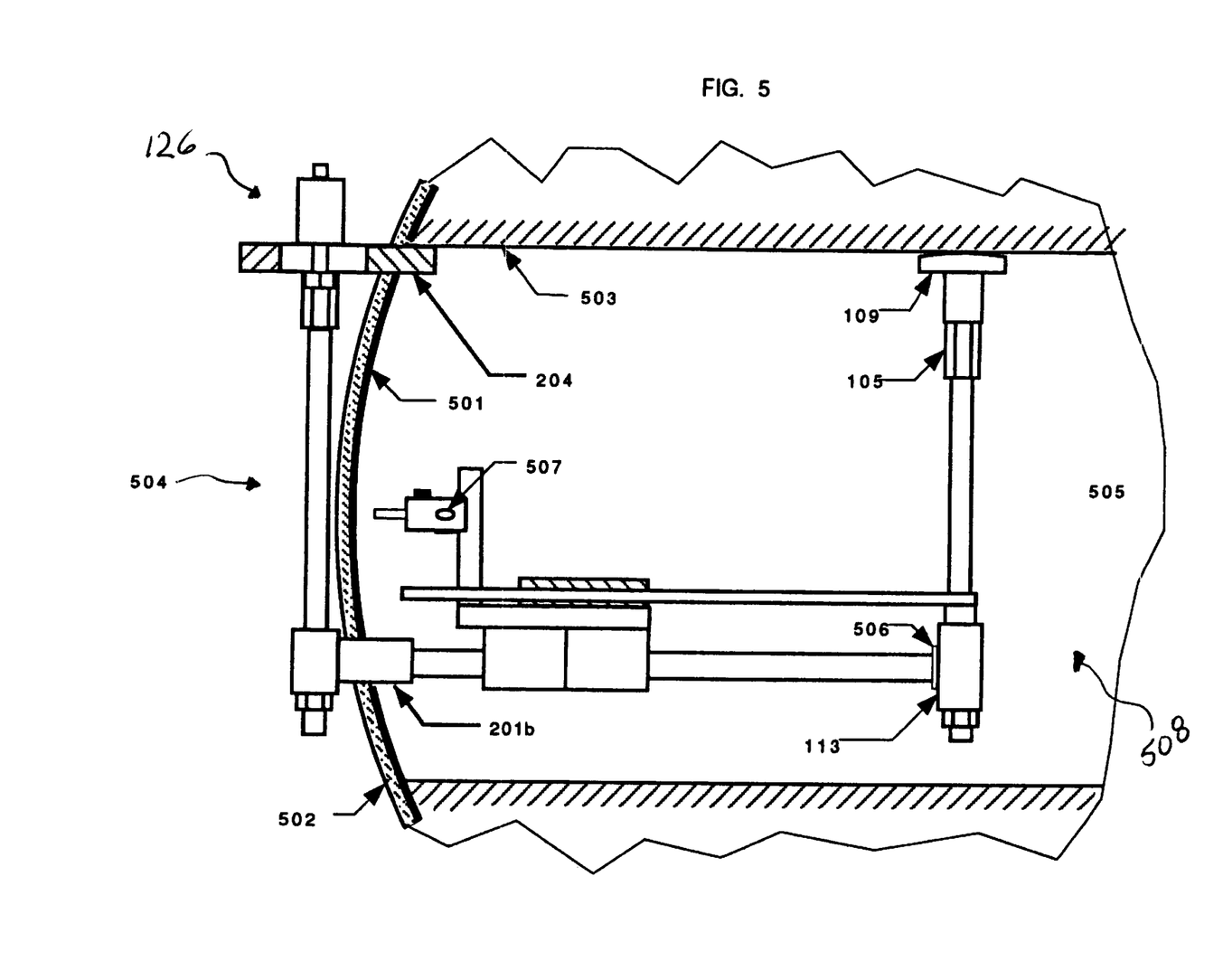
FIG. 5 is a pictorial representation of the slidable fixture positioner assembly of a preferred embodiment of the present invention secured in a propellant bore hole.
Figure 6:
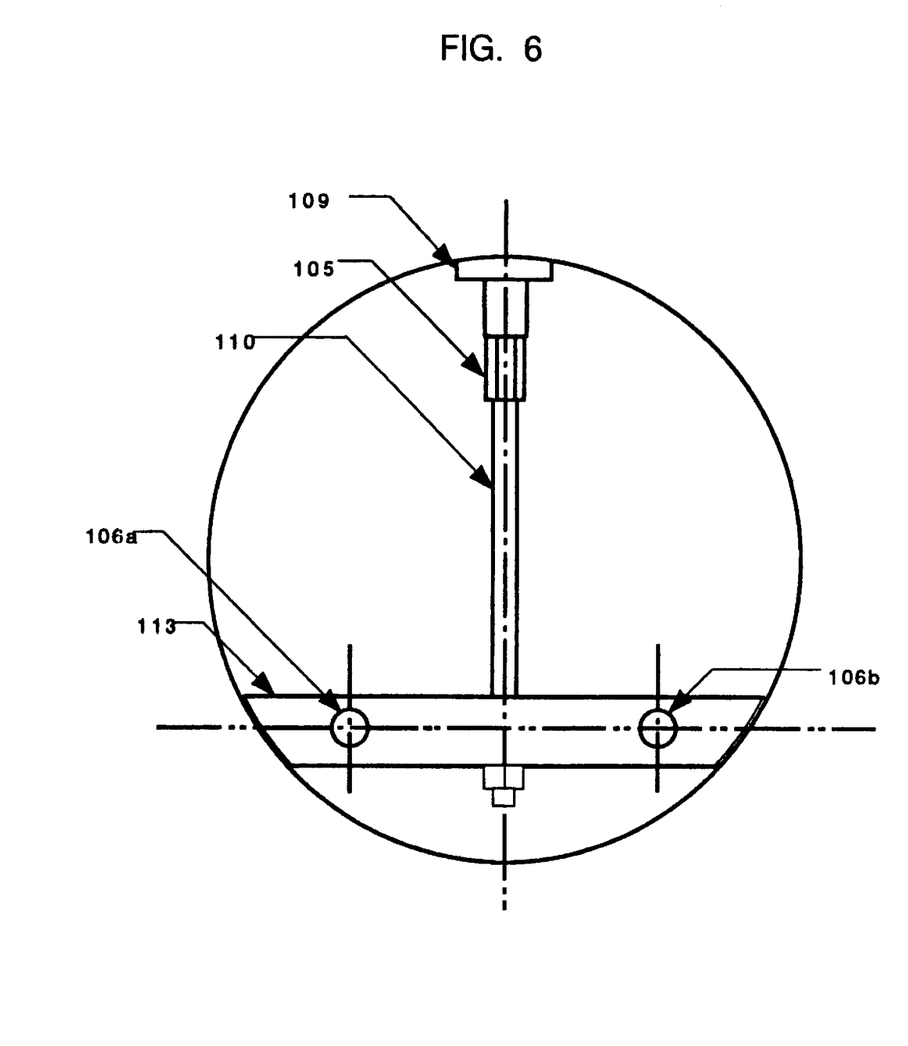
FIG. 6 is a pictorial representation of the inner support assembly of the present invention, which details a preferred alignment of a preferred embodiment of the present invention.

The slidable fixture outer support hardware, FIG. 2, consists of at least two lower feet 201a and 201b attached to the lower outer bar 107 with lower foot screws 205a and 205b and at least one upper foot 204 attached to the upper bar 104 with an upper foot screw 202. The lower feet 201a and 201b and upper foot 204 are used in positioning the slidable fixture positioner 126 in a desired area by setting the lower feet 201a and 201b and upper foot 204 in contact with the desired area, as depicted in FIG. 5. This type of positioning creates stability while minimizing the contact area and limiting and any damage to a contact surface. Also, the lower feet 201a and 201b and upper foot 204 may be shaped to fit flush with the contact area to maximize stability and minimize damage to the contact surface. The locking screws 125a and 125b lock the rails 106a and 106b in place in the lower outer bar 107.

Figure 3:
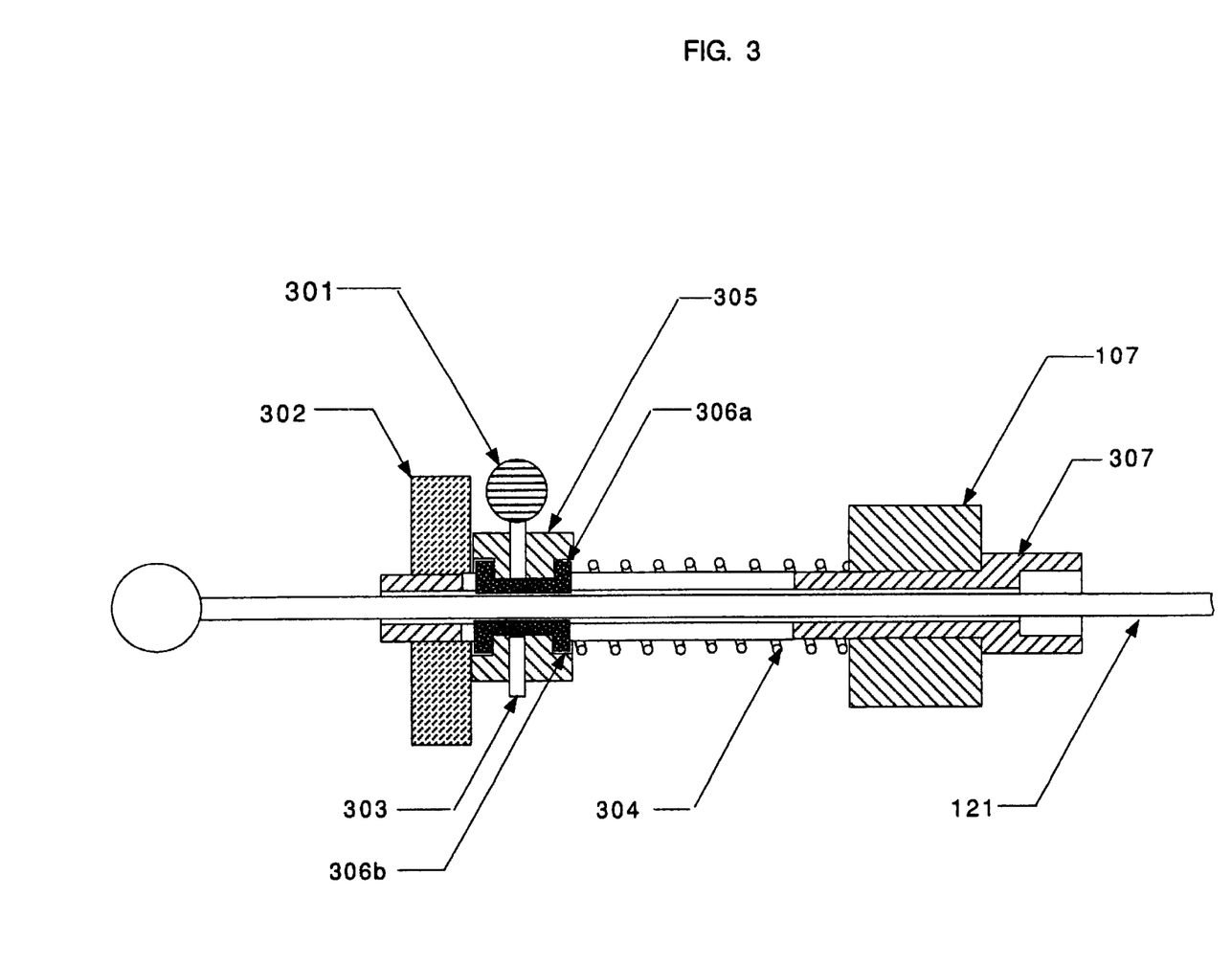
FIG. 3 is a pictorial representation of the vernier assembly of the preferred embodiment of the slidable fixture positioner of a preferred embodiment of the present invention.

Referring to FIG. 3, the vernier assembly 120 consists of a slotted and bored bolt 307 upon which an engagement cylinder 305 is slidably affixed. At one end, the slotted and bored bolt 307 is affixed to the lower outer bar 107. A vernier hand wheel 302 is threadably attached to the bored and slotted bolt 307 and bears against one side of the engagement cylinder 305. The vernier hand wheel 302 is threadably attached at the end of the slotted and bored bolt 307 opposite the lower outer bar 107, as illustrated in FIG. 3. A first end of a first spring 304 bears against the lower outer bar 107 and a second end of the first spring 304 bears against the engagement cylinder 305. This causes the engagement cylinder 305 to remain in a stable position along the slotted and bored bolt 307 bearing against the vernier hand wheel 302. The positioning rod 121 is slidably attached through the bore of the slotted and bored bolt 307. Friction pads 306a and 306b are attached to the engagement cylinder 305 such that the friction pads 306a and 306b are free to slide radially, but restrained longitudinally. The positioning rod 121 runs between the friction pads 306a and 306b. A thumb screw 301 and a set screw 303 are threadably attached to the engagement cylinder 305 and each screw 301 and 303 controls the position of one of the friction pads 306a and 306b.

Figure 4:
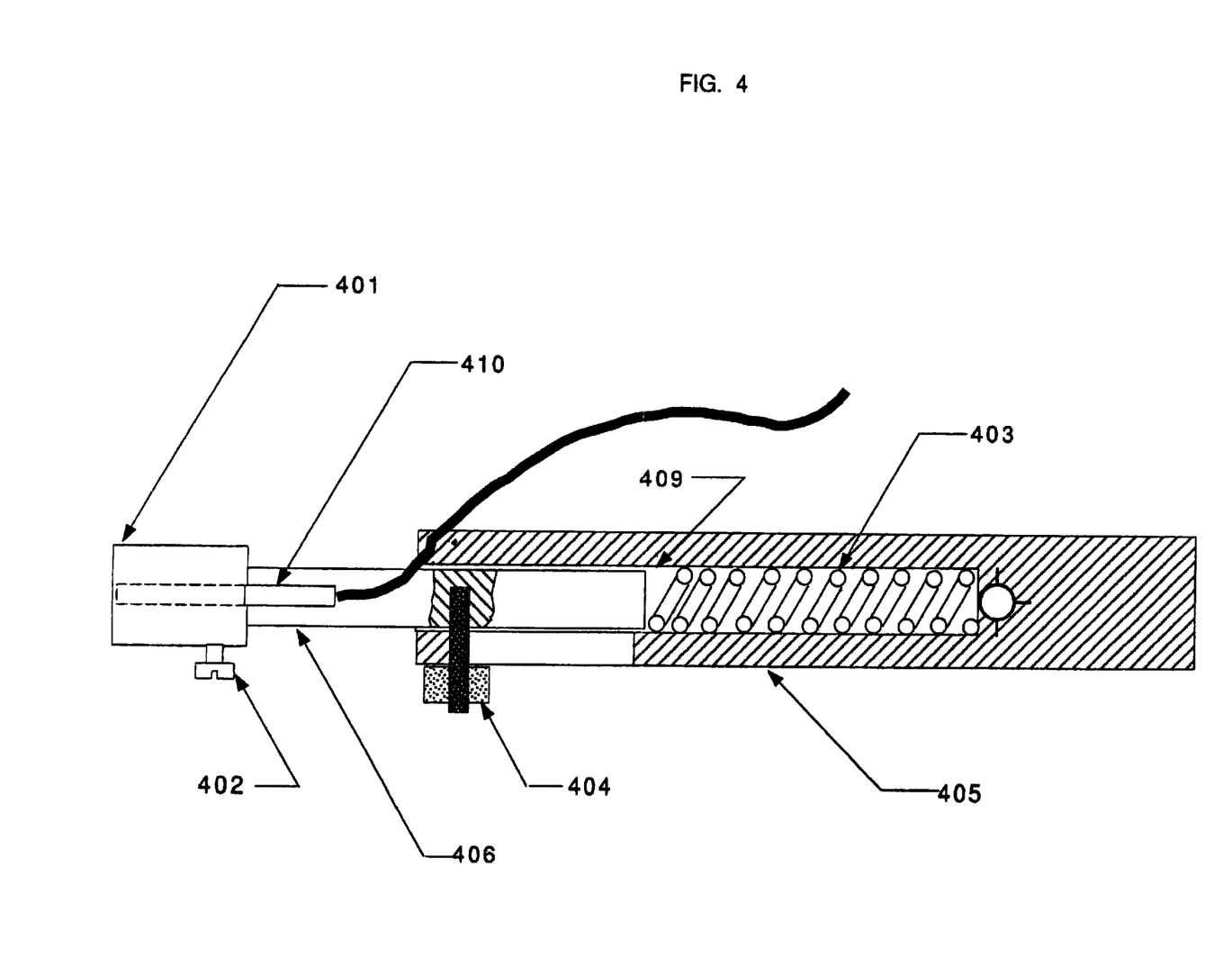
FIG. 4 is a pictorial representation of the device holder assembly of the slidable fixture positioner of a preferred embodiment of the present invention.

Referring to FIG. 4, the device holder assembly 123 consists of a shoe 401 to which a device 410 is slidably attached and locked in place with a retaining screw 402. The shoe 401 is attached to a support rod 406. The support rod 406 is slidably attached to the bored section 409 of a support arm 405 and set in place in the support arm 405 by a locking nut 404. A second spring 403 is contained within the bored section 409 of the support arm 405 such that the bored section 409 restrains one end of the second spring 403 and the other end is restrained by the support rod 406, as illustrated in FIG. 4. The tension of the second spring 403 is carefully selected to minimize the possible damage to the surface of any object being analyzed, such as rocket propellant, which is described below in greater detail.

To better describe the operation of the slidable fixture positioner, the utility as it pertains to a propellant bore hole will be detailed. The following description is not intended to limit the possible utilities of the present invention. Referring to FIG. 5, the present invention may be used to examine the sidewalls of a cylindrical hole bored through the rocket motor outer case 502 and into the propellant 503. The operation is performed with the bore hole 508 longitudinal axis in a horizontal position. The slidable fixture positioner is installed in the propellant bore hole. The slidable fixture may also be used to examine the "as cast" exposed surfaces of the motor central bore. Of particular concern is the area in close proximity to the liner 501.

Referring to FIG. 5, a preferred embodiment of the present invention is positioned in a bore hole with the inner support assembly 505 set in the bottom of the bore hole 508. The outer support subassembly 504 is then slid along the rails 106a and 106b to a desired position. The locking screws 125a and 125b are tightened to secure the lower outer bar 107 to the rails 106a and 106b. Adjusting the tension nut 105 of the pressure foot 109 presses the pressure foot 109 and the position adapters 122a and 122b on the lower inner bar 113 firmly against contact points on the bore wall, securing the inner support subassembly 505 of the slidable fixture positioner 126. In a preferred embodiment, position adapters 122a and 122b are placed on the lower inner bar 113 at the contact points to ensure the stability of the slidable fixture positioner 126 and minimize the damage to propellant 503 or any other surface at the contact points. The position adapters 122a and 122b may be rounded or shaped to fit other surface contours, so that the invention sits flush against the contact points. Also, a single position adapter (not separately shown) that covers the entire lower inner bar 113 may be incorporated. Tightening the tension nuts 111a and 111b of the parallel rods 106a and 106b raises the upper bar 104, which presses the lower feet 201a and 201b and upper foot 204 against the case 502 and propellant bore. This secures the outer support subassembly 504 of a preferred embodiment of the present invention.

The preferred material of construction for the base 102, lower inner bar 113, lower outer bar 107, upper bar 104, rails 106a and 106b, positioning rod 121, upper foot 204, lower feet 201a and 201b, parallel rods 118a and 118b and pressure foot 109 is a metal such as steel, aluminum or stainless steel. Metal provides a durable material at a relatively low cost. In a preferred embodiment, a bumper 506 is affixed to the lower inner bar 113 to cushion contact with the base 102. Two or more bumpers may be utilized in place of a single bumper as illustrated in FIG. 5. The bumper(s) 506 may be constructed of a non-metallic material, such as plastic or fabric, as a safety precaution. A metal-to-metal contact may cause a spark that could ignite propellant or other combustible material. In another preferred embodiment, the parallel rods 118*a* and 118*b* are constructed of metal, such as steel, and the tension nuts 111*a* and 111*b* are constructed of a non-metallic material, such as plastic, as a safety precaution. A metal-to-metal contact may cause a spark that could ignite propellant or other combustible material. Additionally, propellant could get squeezed in several areas as the apparatus is set or adjusted. Also as a safety precaution when using the present invention in area exposed to propellant or other combustible material, the slidable fixture positioner 126 may be grounded through a ground wire (not separately shown) to drain any static charge buildup away from the potentially hazardous area.

Referring to FIG. 3, the vernier assembly 120 is engaged by tightening the thumb screw 301. The thumb screw 301 bears on a first friction pad 306*a*, which grips the positioning rod 121 between the first friction pad 306*a* and a second friction pad 306*b*. The second friction pad 306*b* is supported radially by a set screw 303. The positioning rod 121 passes through the vernier assembly 120 and is attached to the base 102. When the vernier assembly 120 is disengaged, i.e. the grip of the friction pads 306*a* and 306*b* is loosened by adjusting the thumb screw 301 or set screw 303, the base 102 may be positioned with the positioning rod 121. The set screw 303 is adjusted to center the positioning rod 121 so that it does not drag on the slotted and bored bolt bore 307. The friction pads 306*a* and 306*b* are attached to the engagement cylinder 305 so that tightening the thumb screw 301 locks the positioning rod 121 to the engagement cylinder 305. The engagement cylinder 305 is supported on the slotted and bored bolt 307 so that it may move along its length, but it is restrained by the vernier hand wheel 302 and a first spring 304. Referring to FIG. 1 and FIG. 3, when the vernier hand wheel 302 is turned clockwise about the slotted and bored bolt 307, the vernier hand wheel 302 is advanced on the slotted and bored bolt 307 causing the engagement cylinder 305 and positioning rod 121 to be moved along the slotted and bored bolt 307 in small increments. The small incremental changes in the position of the engagement cylinder 305 on the slotted and bored bolt 307 cause corresponding small changes in the position of the positioning rod 121 and base 102. The small changes are detected by the measurement sensing unit 115 and relayed to the position readout box 103 via a data cable 117. Movement of the positioning rod 121 toward the lower inner bar 113 moves the base 102 deeper into the bore hole 508. When the vernier hand wheel 302 is retracted on the slotted and bored bolt 307, the first spring 304 pushes the engagement cylinder 305 and positioning rod 121 away from the lower inner bar 113. Movement of the positioning rod 121 away from the lower inner bar 113 moves the base 102 to out of the bore hole 508. Since the optical probe 410 is attached to the base 102 through the device holder assembly 123, movement of the base 102 results in a corresponding probe 410 movement.

A measurement sensing unit 115, which is attached to the base 102, has the measurement bar 112 sliding through it. The first end of the measurement bar 112 is attached to the lower inner bar 113. The measurement sensing unit 115 senses relative movement of itself along the measurement bar 113. In a preferred embodiment, the relative position information is transmitted over a data cable 117 to the position readout box 103. The position readout box 103 contains a switch (not separately shown), which allows the relative position reading to be set to zero at any point along the measurement bar 112. Once the zero is set, any new table position indicated along the rails 106*a* and 106*b* is set to zero at that point along the measurement bar 112. Once the zero is set, any base 102 position along the rails 106*a* and 106*b* is measured as absolute, relative to the zero set point. A gage is used to position the probe 410 precisely at the bore hole motor case's 502 outer edge. The position readout box 103 is zeroed at this point to establish a longitudinal reference point. Following this, any probe 410 position is read directly on the position readout box 103 as distance from the motor case 502 outer edge to the optical probe 410 imaging center.

Loosening the wing nut 108 allows the device holder assembly 123 to be rotated through approximately 200 degrees about the bore hole's longitudinal axis. This allows the probe 410 to be positioned at various azimuth locations. The gage used to set the table position zero is also used to place a reference mark on the motor case 501 corresponding to the selected probe azimuth position. The azimuth reference mark and outer case zero reference allows the probe 410 to be repositioned at the desired location for future re-examination of a propellant surface 503.

Referring to FIG. 4, the optical probe 410 is placed in the shoe 401 at the desired location and secured in place by tightening the retaining screw 402. Before relocating the optical probe 410, the shoe 401 is moved away from the bore wall compressing the second spring 403 and then, the locking nut 404 is tightened. This holds the shoe 401 away from the bore surface so that the probe 410 may be repositioned without dragging on the propellant 503. When the optical probe 410 is in position, the locking nut 404 is loosened allowing the second spring 403 to lightly press the shoe 401 against the propellant surface 503. In a preferred embodiment, the axis around which the device holder assembly 123 rotates acts as the geometric center of the cylinder created by the bore hole. This enables the relative position of the device holder assembly 123 to be measured and duplicated with a high degree of precision by limiting the relative adjustments of a preferred embodiment of the invention.

The probe 410 is positioned at the desired inspection location by means of the positioning rod 121 while noting this position on the position readout box 103. Sliding the positioning rod 121 into the bore hole moves the optical probe 410 further in the bore hole 508 and retracting it moves the probe 410 out of the bore hole 508. Fine probe position adjustments are made by tightening the thumb screw 301 and turning the vernier hand wheel 302. As a result, the slidable fixture positioner 126 of the present invention may be adapted for use in many areas.

Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. An apparatus for positioning a device, comprising:
   a pair of parallel rails having first ends and second ends;
   a base slidably mounted on said rails;
   a support mounted on said base;
   a device holder attached to said support, wherein said device holder permits rotation about an axis parallel to said rails;
   a measurement sensing unit mounted on said base;
   a lower inner bar affixed to the first end of each of said rails;
   a lower outer bar slidably attached to the second end of each of said rails;
   a pair of parallel rods, each having a first end and a second end, wherein the first end of each of said parallel rods is affixed to said lower outer bar;

an upper bar slidably attached to the second end of each of said parallel rods;

a positioning rod affixed to said base, wherein said positioning rod controls movement of said base along said rails;

a foot rod having a first end and a second end, wherein the first end of said foot rod is affixed to said lower inner bar;

a pressure foot slidably attached to the second end of said foot rod; and a measuring bar affixed to said lower inner bar, wherein said measuring bar is guided by said measurement sensing unit and wherein said measurement sensing unit detects a position of said base along each of said rails.

2. The apparatus of claim 1, wherein said measurement sensing unit further comprises
program means for generating display data of the position of said base.

3. The apparatus of claim 2, wherein said program means is a position readout box.

4. The apparatus of claim 1, further comprising:
means for locking said lower outer bar in a position along said rails.

5. The apparatus of claim 1, further comprising:
a vernier assembly slidably attached to said positioning rod.

6. The apparatus of claim 5, wherein said vernier assembly is attached to said lower outer bar, said vernier assembly comprising:

a slotted and bored bolt, having a first and second end, with the first end affixed to said lower outer bar, wherein said positioning rod moves through the bore of said bolt;

an engagement cylinder slidably attached to said slotted and bored bolt;

a first spring, having first and second ends, with said first spring's the first end affixed to said engagement cylinder and said first spring's second end affixed to said lower outer bar, wherein said first spring stabilizes the position of said engagement cylinder along said bolt; and a vernier hand wheel threadably attached to the second end of said bolt and bearing against said engagement cylinder, wherein said vernier hand wheel restrains movement of said engagement cylinder along said bolt on a side of said engagement cylinder opposite the first end of said first spring.

7. The apparatus of claim 6, wherein said vernier assembly further comprises:

a first and a second friction pads attached to said engagement cylinder, wherein said first and second friction pads grip said positioning rod;

a thumb screw threaded through said engagement cylinder, wherein said thumb screw is in contact with said first friction pad and said thumb screw controls the position of said first friction pad, so that retracting said thumb screw loosens contact of said first friction pad against said positioning rod allowing said positioning rod to move through said engagement cylinder; and a set screw threaded through said engagement cylinder, wherein said set screw is in contact with said second friction pad and said set screw controls the position of said second friction pad, so that retracting said set screw loosens contact of said second friction pad against said positioning rod allowing said positioning rod to move through said engagement cylinder.

8. The apparatus of claim 1, wherein said device holder further comprises:

a support arm, having a threaded section, rotatably attached to said support;

a support rod, having a first and second ends, with the first end slidably inserted into said support arm;

a second spring having a first end affixed to the first end of said support rod and a second end inserted into said support arm, wherein said second spring stabilizes the position of said support rod in said support arm;

a shoe attached to the second end of said support rod wherein said shoe slidably receives a device;

a retaining screw threaded through said shoe, wherein said retaining screw holds the device in a stationary position; and a locking nut threadably attached to said threaded section of said support arm, wherein said locking nut holds the support rod in a stationary position.

9. The apparatus of claim 1, further comprising at least one bumper attached to said lower inner bar, wherein said bumper prevents metal-to-metal contact between said base and said lower inner bar.

10. The apparatus of claim 9, wherein said bumper is constructed of non-metal, plastic or fabric.

11. The apparatus of claim 1, further comprising at least one position adapter affixed to said lower inner bar, wherein said position adapter is shaped to mate evenly to a surface whereupon said apparatus is positioned.

12. The apparatus of claim 1, further comprising tension nuts threadably attached to each of said parallel rods, wherein each of said tension nuts support said upper bar.

13. The apparatus of claim 1, further comprising:
at least one upper foot affixed to said upper bar; and
at least two lower feet affixed to said lower bar, wherein said lower feet and upper foot stabilize the second end of each of said parallel rails.

14. The apparatus of claim 13, wherein said upper feet and lower feet are constructed of non-metal, plastic or fabric.

15. The apparatus of claim 1, wherein said device is an optical probe.

16. An apparatus for positioning a device, comprising:
a plurality of parallel rails each having a first end and a second end;
a base slidably mounted on said plurality of parallel rails;
a support mounted on said base;
a device holder attached to said support, wherein said device holder permits rotation about an axis parallel to said plurality of parallel rails;
a means for detecting a position of said base along said plurality of rails;
a lower inner bar affixed to the first end of each of said plurality of parallel rails;
a lower outer bar slidably attached to the second end of each of said plurality of parallel rails;
a plurality of parallel rods, each having a first end and a second end, wherein the first end of each of said plurality of parallel rods is affixed to said lower outer bar;
an upper bar slidably attached to the second end of each of said plurality of parallel rods;
a positioning rod affixed to said base, wherein said positioning rod manipulates movement of said base along said plurality of rails;

at least one foot rod having a first end and a second end, wherein the first end of said foot rod is affixed to said lower inner bar; and a pressure foot slidably attached to the second end of said foot rod.

17. The apparatus of claim 16 wherein said means for detecting a position of said base along said plurality of rails is a measurement sensing unit.

18. The apparatus of claim 17, further comprising:

a measuring bar affixed to said lower inner bar, wherein said measuring bar is guided by said measurement sensing unit.

19. The apparatus of claim 16 further comprising a vernier assembly, wherein said vernier assembly comprises:

a slotted and bored bolt, having a first and second end, with the first end affixed to said lower outer bar, wherein said positioning rod moves through the bore of said bolt;

an engagement cylinder slidably attached to said slotted and bored bolt;

a first spring, having first and second ends, with said first spring's the first end affixed to said engagement cylinder and said first spring's second end affixed to said lower outer bar, wherein said first spring stabilizes the position of said engagement cylinder along said bolt; and a vernier hand wheel threadably attached to the second end of said bolt and bearing against said engagement cylinder, wherein said vernier hand wheel restrains movement of said engagement cylinder along said bolt on a side of said engagement cylinder opposite the first end of said first spring.

20. The apparatus of claim 16, wherein said device holder further comprises:

a support arm, having a threaded section, rotatably attached to said support;

a support rod, having a first and second ends, with the first end slidably inserted into said support arm;

a second spring having a first end affixed to the first end of said support rod and a second end inserted into said support arm, wherein said second spring stabilizes the position of said support rod in said support arm;

a shoe attached to the second end of said support rod wherein said shoe slidably receives a device;

a retaining screw threaded through said shoe, wherein said retaining screw holds the device in a stationary position; and a locking nut threadably attached to said threaded section of said support arm, wherein said locking nut holds the support rod in a stationary position.

\* \* \* \* \*